(12) United States Patent
Dudar

(10) Patent No.: US 10,399,106 B2
(45) Date of Patent: Sep. 3, 2019

(54) CAMERA AND WASHER SPRAY DIAGNOSTIC

(71) Applicant: Ford Global Technologies, LLC, Dearborn, MI (US)

(72) Inventor: Aed M. Dudar, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 326 days.

(21) Appl. No.: 15/409,646

(22) Filed: Jan. 19, 2017

(65) Prior Publication Data

US 2018/0200745 A1    Jul. 19, 2018

(51) Int. Cl.
| | |
|---|---|
| *B05B 12/00* | (2018.01) |
| *B05B 12/08* | (2006.01) |
| *B05B 12/10* | (2006.01) |
| *G01C 21/34* | (2006.01) |
| *G06T 7/00* | (2017.01) |
| *H04N 7/18* | (2006.01) |
| *B05B 9/00* | (2006.01) |
| *B05B 9/04* | (2006.01) |
| *G01C 21/36* | (2006.01) |

(52) U.S. Cl.
CPC .......... *B05B 12/004* (2013.01); *B05B 12/006* (2013.01); *B05B 12/085* (2013.01); *B05B 12/10* (2013.01); *G01C 21/34* (2013.01); *G06T 7/001* (2013.01); *G06T 7/0004* (2013.01); *H04N 7/185* (2013.01); *B05B 9/002* (2013.01); *B05B 9/0403* (2013.01); *G01C 21/3415* (2013.01); *G01C 21/3602* (2013.01); *G06T 2207/30168* (2013.01); *G06T 2207/30252* (2013.01)

(58) Field of Classification Search
CPC ... B05B 12/004; B05B 12/006; B05B 12/085; B05B 12/10; B05B 9/002; B05B 9/0403; G01C 21/34; G01C 21/3415; G01C 21/3602; G06T 2207/30168; G06T 2207/30252; G06T 7/0004; G06T 7/001; H04N 7/185
USPC ...................................................... 701/32.3
See application file for complete search history.

(56) References Cited

U.S. PATENT DOCUMENTS

| | | | |
|---|---|---|---|
| 6,032,097 A | 2/2000 | Iihoshi et al. | |
| 8,964,030 B2 | 2/2015 | Itoh et al. | |
| 9,972,054 B1 * | 5/2018 | Konrardy ................. | G07C 5/08 |
| 10,176,524 B1 * | 1/2019 | Brandmaier ............ | G06Q 40/08 |
| 2003/0167123 A1 * | 9/2003 | Nakazawa ............. | G08G 1/166 |
| | | | 701/301 |

(Continued)

FOREIGN PATENT DOCUMENTS

CN    105844282 A    8/2016

OTHER PUBLICATIONS

Search Report dated Jul. 10, 2018 issued by the United Kingdom's Intellectual Property Office regarding Application No. GB1800796.3 (4 pages).

*Primary Examiner* — Angelina Shudy
(74) *Attorney, Agent, or Firm* — Frank A. MacKenzie; Bejin Bieneman PLC

(57) ABSTRACT

A system including a computer programmed to actuate a spray device on a first vehicle and to receive an image, from a second vehicle, of the actuated spray device. The computer determines whether a spray device fault exists based at least on the image of the actuated spray device, and transmits the spray device fault via a first vehicle communications network.

20 Claims, 8 Drawing Sheets

(56) References Cited

U.S. PATENT DOCUMENTS

| | | | |
|---|---|---|---|
| 2008/0046150 A1* | 2/2008 | Breed | B60R 21/0134 701/45 |
| 2010/0100275 A1* | 4/2010 | Mian | G01M 17/013 701/31.4 |
| 2014/0009616 A1* | 1/2014 | Nakamura | H04N 7/18 348/148 |
| 2014/0355839 A1* | 12/2014 | Bridgers | G06T 7/0004 382/108 |
| 2015/0070503 A1* | 3/2015 | Kraeling | H04N 5/23203 348/148 |
| 2015/0158499 A1* | 6/2015 | Koravadi | B60T 7/12 701/23 |
| 2015/0298657 A1 | 10/2015 | Kanter et al. | |
| 2016/0379350 A1* | 12/2016 | Matsui | B60Q 1/44 348/125 |
| 2017/0183007 A1* | 6/2017 | Oh | B60W 30/16 |
| 2017/0278312 A1* | 9/2017 | Minster | G05D 1/0297 |
| 2017/0313332 A1* | 11/2017 | Paget | B61L 27/0077 |
| 2018/0147986 A1* | 5/2018 | Chi | H04N 5/23218 |
| 2018/0293552 A1* | 10/2018 | Zhang | G06N 3/0454 |
| 2018/0300964 A1* | 10/2018 | Lakshamanan | G07C 5/008 |
| 2018/0334140 A1* | 11/2018 | Ghannam | B60S 1/485 |
| 2018/0348771 A1* | 12/2018 | Chu | G05D 1/0214 |
| 2019/0012913 A1* | 1/2019 | She | G08G 1/096816 |
| 2019/0025820 A1* | 1/2019 | Ferguson | G08G 1/143 |
| 2019/0051015 A1* | 2/2019 | Gonzalez Aguirre | G06T 7/80 |
| 2019/0135231 A1* | 5/2019 | Sakuma | B60R 25/305 |
| 2019/0144001 A1* | 5/2019 | Choi | B60W 50/14 |

* cited by examiner

CAMERA AND WASHER SPRAY DIAGNOSTIC

BACKGROUND

Autonomous vehicles use a variety of sensors and computing devices to navigate the vehicle to a destination with various levels of input from a human driver. The Society of Automotive Engineers (SAE) has defined multiple levels of autonomous vehicle operation. At levels 0-2, the human driver monitors or controls the majority of the driving tasks, often with no help from the vehicle. For example, at level 0 ("no automation"), a human driver is responsible for all vehicle operations. At level 1 ("driver assistance"), the vehicle sometimes assists with steering, acceleration, or braking, but the driver is still responsible for the vast majority of the vehicle control. At level 2 ("partial automation"), the vehicle can control steering, acceleration, and braking under certain circumstances without human interaction. At levels 3-5, the vehicle assumes more driving-related tasks. At level 3 ("conditional automation"), the vehicle can handle steering, acceleration, and braking under certain circumstances, as well as monitoring of the driving environment. Level 3 requires the driver to intervene occasionally, however. At level 4 ("high automation"), the vehicle can handle the same tasks as at level 3 but without relying on the driver to intervene in certain driving modes. At level 5 ("full automation"), the vehicle can handle almost all tasks without any driver intervention.

Autonomous vehicles may group together to form a platoon. In the platoon, the vehicles utilize sensors, computing devices, and vehicle-to-vehicle (V2V) communication devices and protocols to travel in a compact line along a single lane of a road way. Autonomous vehicle platooning allows vehicles to travel much closer to each other in the line, as compared to being operated solely by the human driver, thereby increasing the efficiency of travel of the vehicles and reducing roadway congestion.

DETAILED DESCRIPTION

Introduction

Figure 1:
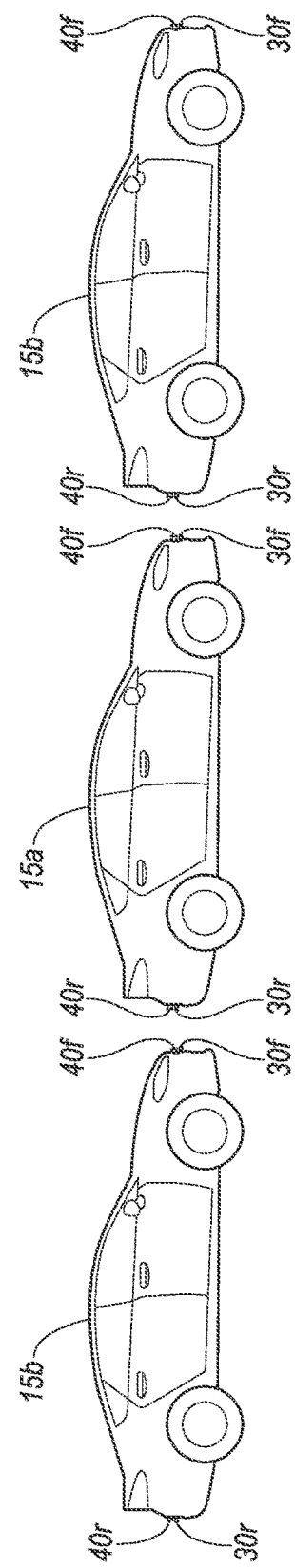
FIG. 1 is side view of an example first vehicle and example second vehicles in a platoon.
Figure 2:
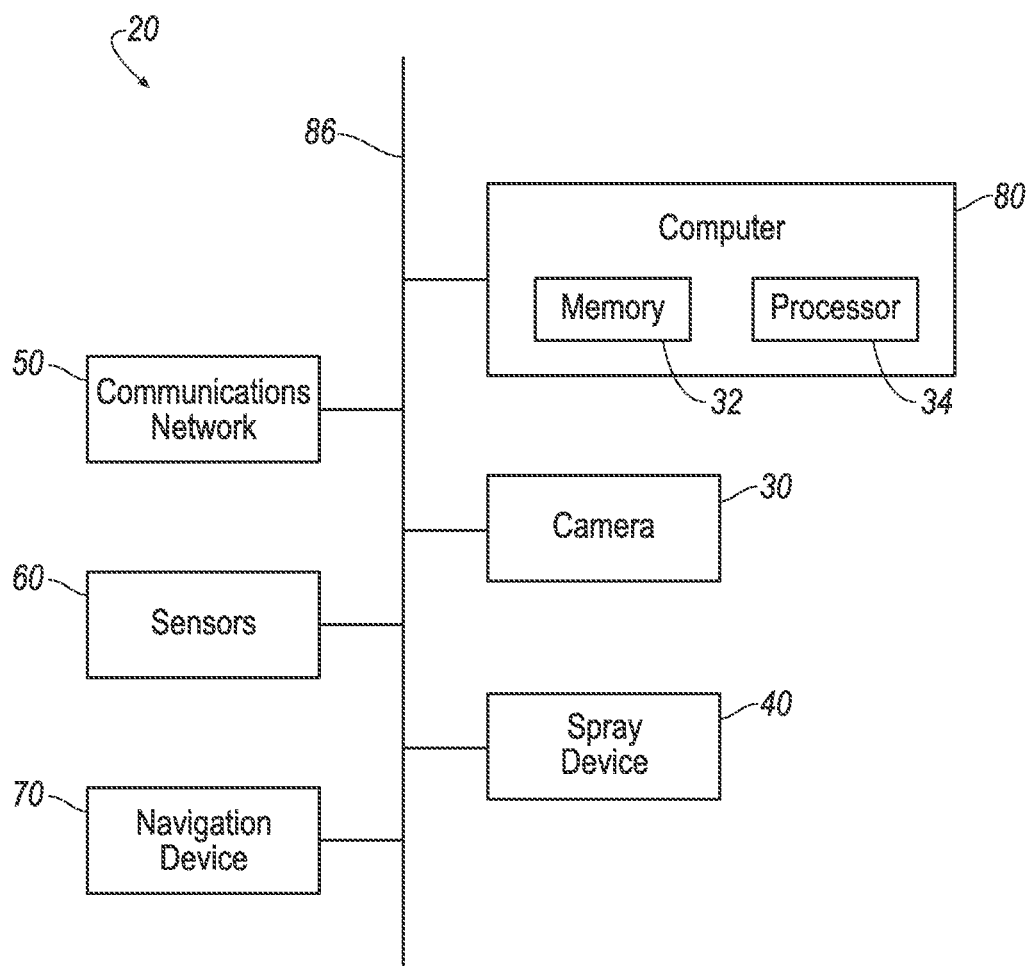
FIG. 2 is a block diagram of a vehicle camera and washer spray diagnostic system.

With reference to the Figures, wherein like numerals indicate like parts throughout the several views, the disclosed camera and spray device diagnostic system 20 addresses a problem that in an autonomous vehicle 15a it may be difficult to determine whether a camera 30 and/or a spray device 40 are operating properly (see FIGS. 1 and 2). Accordingly, a computer 80 is programmed to actuate the spray device 40 on a first vehicle 15a and to receive an image, from a second vehicle 15b, of the actuated spray device 40. The computer 80 determines whether a spray device fault exists based at least on the image of the actuated spray device 40, and transmits the spray device fault via a first vehicle 15a communications network 50. Additionally the computer 80 may also receive an image from the second vehicle 15b of the spray device 40 prior to actuation and further base the determination of whether the spray device fault exists at least on the image of the spray device 40 prior to actuation. Based on the determination, the computer 80 can perform one or more remediation actions, such as navigating the first vehicle 15a to a service facility, and/or actuating a navigation sensor 60.

System

In the following description, relative orientations and directions (by way of example, front, rear, etc.) are from the perspective of an occupant seated in the vehicle 15a 15b facing a dashboard of the vehicle 15a 15b. The adjectives "first" and "second" are used throughout this document as identifiers and are not intended to signify importance or order.

With reference to FIGS. 1 and 2, the first vehicle 15a is shown in a platoon formation with second vehicles 15b. The first vehicle 15a and second vehicle 15b each may include the diagnostic system 20 that may include one or more cameras 30, one or more spray devices 40, the communications network 50, one or more sensors 60, a navigation device 70, and the computer 80.

The camera 30 can capture two-dimensional digital images comprised of pixels. The camera 30 may capture still and/or video images in the visible light spectrum. The camera 30 may capture images outside of the visual spectrum, for example, using an infrared sensor to capture an infrared image showing detected temperatures. The captured images are converted to electronic information to be transmitted and stored in a memory 84 of the computer 80, e.g., as a file. The camera 30 may be supported on the vehicle 15a 15b in various locations and orientations, such a front camera 30f, i.e., located and oriented to capture images in front of the vehicle 15a 15b, and a rear camera 30r, i.e., located and oriented to capture images rear of the vehicle 15a 15b.

The spray device 40 includes components known for delivering fluid 44 to a surface of the vehicle 15a 15b, including one or more nozzles 46, a fluid reservoir and a fluid pump (see FIGS. 3-7). The spray device 40 may include an electronic controller, such as is known, programmed to actuate the fluid pump between an "on" state and an "off" state in response to a received command, e.g., from the computer 80. In the "on" state the spray device 40 sprays fluid 44 from the nozzle 46. In the "off" state the spray device 40 does not spray fluid 44 from the nozzle 46. The spray device may remain in the "on" state until actuated to the "off" state. Additionally or alternatively, the spray device may remain in the "on" state for a predetermined amount of time, e.g., 3 seconds. The spray device 40 controller may be a microprocessor-based controller implemented via circuits, chips, or other electronic components. For example, the controller may include a processor, memory, etc. The memory of the controller may include memory for storing instructions executable by the processor as well as for electronically storing data and/or databases.

The spray device 40 nozzles 46, the fluid reservoir and the fluid pump (these known components not shown in the drawings for ease of illustration) are in fluid communication such that the spray device 40 actuates to pump fluid 44 from the fluid reservoir through the nozzles 46 towards various surfaces and components of the vehicle 15a 15b. The nozzle 46 of the spray device 40 may be positioned to spray fluid 44 towards one of the cameras 30, e.g., a front spray device 40f positioned to spray the front camera 30f or a rear spray device 40r positioned to spray the rear camera 30r.

The spray device 40 may include a fluid heater 47. The fluid heater 47 may be disposed within the fluid reservoir, or located in-line with the fluid flow from the reservoir to the nozzles 46 of the spray device 40. The fluid heater 47 may include and be actuated by an electronic controller such as is known in electronic communication with the computer 80, e.g. via the vehicle network 86. The fluid heater 47 actuates to heat the fluid 65 of the spray device 40 before the fluid 44 is sprayed from the nozzle 46.

The communications network 50 includes hardware, such as an antenna, circuits, chips, etc., for facilitating communication between vehicles, infrastructure, or both. The communications network 50 may facilitate wired or wireless communication among the vehicle components in accordance with a number of communication protocols such as the Dedicated Short Range Communication (DSRC) communication protocol, controller area network (CAN), Ethernet, WiFi, Local Interconnect Network (LIN), and/or other wired or wireless mechanisms. The communications network 50 may include a transceiver. The transceiver transmits and receives information wirelessly from other transceivers, enabling signals, data and other information to be exchanged with other computer and network systems. The transceiver is implemented via antennas, circuits, chips, or other electronic components that can facilitate wireless communication. Example transceivers include Wi-Fi systems, radio transmitters and receivers, telecommunications systems, Bluetooth® systems, cellular systems and mobile satellite transceivers. The transceiver may communicate with other vehicles, e.g., the second vehicle 15b, such as by using known vehicle-to-vehicle (V2V) techniques and/or products.

The sensors 60 may detect internal states of a vehicle 15a 15b, for example, wheel speed, wheel orientation, and engine and transmission variables. The sensors 60 may detect the position or orientation of the vehicle, for example, global positioning system (GPS) sensors; accelerometers such as piezo-electric or microelectromechanical systems (MEMS) sensors; gyroscopes such as rate, ring laser, or fiber-optic gyroscopes; inertial measurements units (IMU); and magnetometers. The sensors 60 may detect the external world, for example, radar sensors, scanning laser range finders, temperature sensors, light meters, light detection and ranging (LIDAR) devices, and image processing sensors such as cameras. The sensors 60 may include communications devices, for example, vehicle-to-infrastructure (V2I) or vehicle-to-vehicle (V2V) devices. The sensors 60 may be used by the vehicle 15a 15b to gather information for autonomous navigation of the vehicle 15a 15b, and are referred to herein as navigation sensors 60.

The navigation device 70 determines a location of the vehicle 15a 15b based on stored map data. Map data may include roads and related data, such as a number of lanes and availability of a shoulder, parking lot and public rest area locations, etc. To determine the location, the navigation device 70 may rely on information from a global navigation satellite system, distance data from vehicle sensors 60 attached to a drivetrain of the vehicle 15a 15b, a gyroscope, and/or an accelerometer, etc. The map data may be stored locally, such as on the memory 84, or on the navigation device 70. Additionally or alternatively, the map data may be stored on a remote computer or network, accessible via the communications network 50. Example navigation devices 70 include known GPS (global positioning system) navigation devices, personal navigation devices, and automotive navigation systems.

The computer 80 is a computing device that includes a processor 82 and the memory 84. The computer 80 is in electronic communication with, e.g., via a vehicle network 86, one or more input devices for providing data to the computer 80 and one or more output devices for receiving data and/or instructions from the computer 80, e.g., to actuate the output device. Example input devices include: the camera 30, the communications network 50, the sensors 60, the navigation device 70, etc., as well as other sensors and/or electronic control units (ECUs) that provide data to the computer 80. Example output devices that may be actuated by the computer 80 include: the spray device 40, the communications network 50, etc.

The processor 82 is implemented via circuits, chips, or other electronic components and may include one or more microcontrollers, one or more field programmable gate arrays (FPGAs), one or more application specific circuits (ASICs), one or more digital signal processors (DSPs), one or more custom integrated circuits, etc. The processor 82 is programmable to process the data and communications received via the camera 30, the communications network 50, the sensors 60, the memory 84, etc., as well as other sensors and/or electronic control units (ECUs) that provide data to the computer 80, e.g., on the vehicle network 86. Processing the data and communications may include processing to: actuate the spray device 40 on the first vehicle 15a; receive an image from the second vehicle 15b of the actuated spray device 40; determine whether a spray device fault exists based at least on the image; and transmit the spray device fault via the first vehicle 15a communications network 50. The processor may further be programmed for performing the processes described herein.

The memory 84 is implemented via circuits, chips or other electronic components and can include one or more of read only memory (ROM), random access memory (RAM), flash memory, electrically programmable memory (EPROM), electrically programmable and erasable memory (EEPROM), an embedded MultiMediaCard (eMMC), a hard drive, any volatile or non-volatile media, etc. The memory 84 may store programming instructions for performing the processes described herein, and data collected from sensors and communications.

The vehicle network 86 includes hardware, such as a communication bus, for facilitating communication among vehicle components. The communication network may facilitate wired or wireless communication among the vehicle components in accordance with a number of communication protocols such as controller area network (CAN), Ethernet, WiFi, Local Interconnect Network (LIN), and/or other wired or wireless mechanisms.

The computer 80 may be programmed to determine whether an image from the camera 30 on the first vehicle 15*a* is below a predetermined quality threshold. To determine whether the image from the camera 30 is below the predetermined quality threshold, the computer 80 may analyze characteristics of the image. For example, the computer 80 may compare an average brightness of the image with a threshold brightness level, e.g. 5% (where 0% is a completely dark, i.e. black, image and 100% is a completely light, i.e. white, image), by using known image analysis algorithms and techniques. When the image is below the threshold brightness level, such as when there is dirt or contaminant covering the camera 30, the computer 80 may determine that the image is below the predetermined quality threshold.

The computer 80 may be programmed to transmit an image request, e.g., to the second vehicle 15*b*. To transmit the image request, the computer 80 may instruct the communications network 50, e.g., by sending a command to the communications network 50 via the vehicle network 86, to perform such transmission. The image request may be transmitted in response to determining the image from the camera 30 on the first vehicle 15*a* is below the predetermined quality threshold. The image request may include information identifying the intended recipient of the image request, e.g., the second vehicle 15*b*, such as a vehicle identification number or other unique identifier. The image request may include a position of the first vehicle 15*a* relative to the second vehicle 15*b*, e.g., in front or behind, so that the second vehicle 15*b* may actuate the appropriate camera 30, e.g., the front camera 30*f* or the rear camera 30*r*, to capture an image of the camera 30, and the spray device 40 positioned to spray such camera 30, determined by the first vehicle 15*a* as providing the image below the predetermined threshold quality. The image request may include a request for an infrared image.

The computer 80 may be programmed to receive an image from the second vehicle 15*b*. For example, the image may be transmitted from the second vehicle 15*b* and received by the first vehicle 15*a* via the communications network 50. The computer 80 may receive the image from the communications network 50 via the vehicle network 86. The image may include information identifying the second vehicle 15*b*, and/or a position of the second vehicle 15*b* relative to the first vehicle 15*a*.

The computer 80 may be programmed to actuate the spray device 40 on or in the first vehicle 15*a*. To actuate the spray device 40 the computer 80 may send a command to the spray device 40 via the vehicle network 86. The command may instruct the spray device 40 to actuate to the "on" state or to actuate to the "off" state. The computer 80 may direct the command to a specific spray device 40, e.g., the front spray device 40*f* or the rear spray device 40*r*.

The computer 80 may be programmed to actuate the fluid heater 47 to heat the fluid 44 of the spray device 40. To actuate the fluid heater 47 the computer 80 may send a command to the fluid heater 47 via the vehicle network 86.

The computer 80 may determine to actuate the fluid heater 47 when the ambient temperature in an environment surrounding the vehicle is below a predetermined temperature threshold, e.g., freezing or a temperature slightly above freezing, e.g., 34 degrees Fahrenheit. The computer 80 may identify the ambient temperature based on an electrical signal received from one or more input device, such as a temperature sensor 60.

The computer 80 may determine to actuate the fluid heater 47 based on a time of day or amount of ambient light. For example, at night, there might not be sufficient ambient light for image analysis in the visible light spectrum. Actuation may be based on a table indicating specific times for infrared analysis, such as a table including times of sunset and sunrise. Actuation may be based on an ambient light being below a threshold amount, e.g. 400 lux, measured with a light meter sensor 60 on the vehicle 15*a*.

The computer 80 may wait a predetermined minimum amount of time, e.g., 5 seconds, after actuating the fluid heater 47 to heat the fluid 44 before actuating the spray device 40 to spray the fluid 44. Waiting the predetermined amount of time allows the fluid heater 47 sufficient time to accumulate heat energy to warm the sprayed fluid 44. The predetermined wait time may be a fixed amount of time, or it may be determined by the computer 80. For example, various ambient temperatures may be associated with various wait times in a table or the like stored in the memory 84 of the computer 80, with lower temperatures associated with longer wait times.

The computer 80 may be programmed to determine whether a spray device 40 fault exists and/or identify the spray device 40 fault. A "spray device fault" is a condition of the spray device 40 causing the spray device 40 to not function properly. For example, the spray device 40 may be dirty, clogged, damaged such that the spray device 40 does not spray fluid in the intended direction, etc.

The computer 80 may determine whether the spray device fault exists based at least on the image of the actuated spray device 40, i.e., of the spray device 40 in the "on" state, received from the second vehicle 15*b*. For example, the computer 80 may analyze characteristics of the image of the actuated spray device 40. For example, the computer 80 may analyze the image to identify a blurred or grainy area in the image, e.g., by using known image analysis algorithms and techniques. The blurred or grainy area in the image may be created by the movement of the fluid 44 spraying from the nozzle 46 of the spray device 40. The blurred or grainy area may be analyzed with criteria such as a size, a shape, a location relative to another object identified in the image, a pixel density, etc. The computer 80 may analyze the images to identify an area of increased temperature in the image, e.g., 10 degrees Fahrenheit above surrounding areas, by using known image analysis algorithms and techniques. Criteria may be stored in the memory 84, e.g., as a file, indicating an expected size, shape, and/or position of the blurred, grainy, or increased temperature area when no spray device fault exists. The stored criteria characteristics may be compared to the characteristics of the blurred or grainy area in the image.

Figure 4:
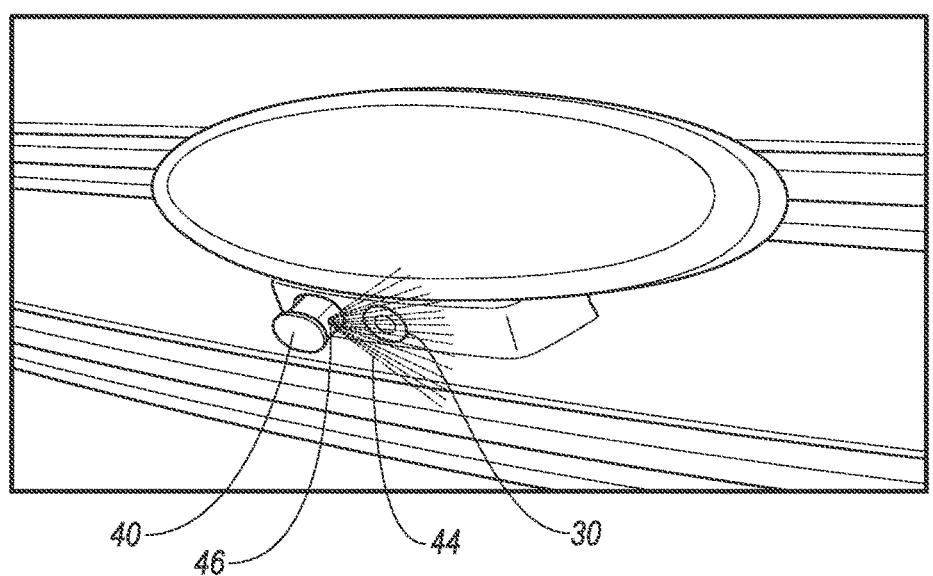
FIG. 4 is an illustration of an image of the first vehicle during actuation of the spray device.
Figure 6:
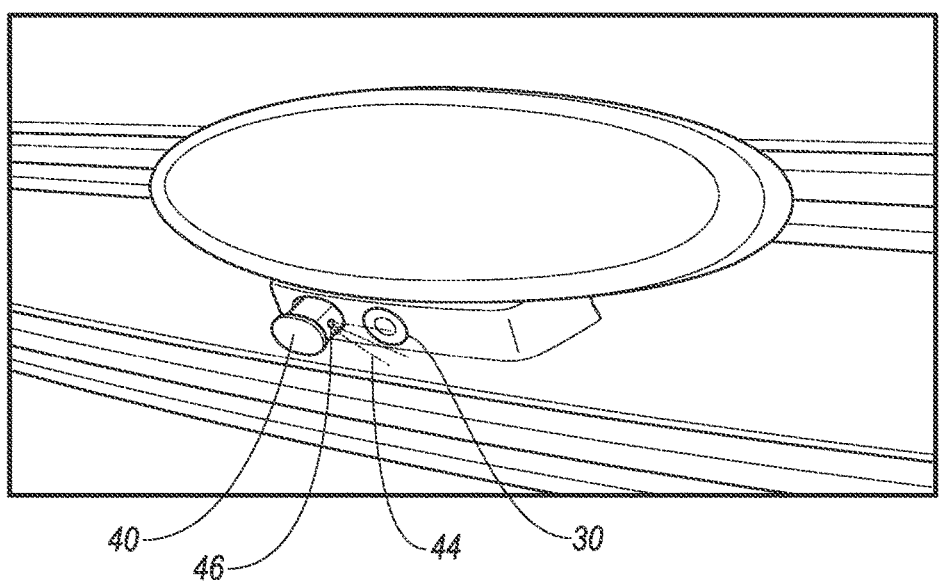
FIG. 6 is an illustration of another image of the first vehicle during actuation of the spray device.

For example, in FIGS. 4 and 6 representations of images of the first vehicle 15*a* with the spray device 40 actuated to the "on" state are shown. The computer 80 may analyze the images, such as by using known image analysis techniques and algorithms, to compare the expected size, shape, and/or pixel density of the fluid 44 with the fluid 44 identified in the image. For example, the size, shape, and/or pixel density of the fluid 44 in FIG. 4 may be analyzed relative to an expected size, shape, and/or pixel density, e.g. a triangle of a certain size and pixel density. Based on such analysis, the computer 80 may determine that no spray device fault exists based on the size of the triangle and the density of the pixels created by the fluid 44. In another example the size, shape, and/or pixel density of the fluid 44 in FIG. 6 may be analyzed relative to the expected triangle of certain size and pixel density. Based on such analysis, the computer 80 may determine that a spray device fault exists based on the size of the triangle and the density of the pixels created by the fluid 44.

The computer 80 may determine whether the spray device fault exists based at least on the image of the spray device 40 received from the second vehicle 15b prior to actuation, i.e., while the spray device 40 is in the "off" state. For example, the computer 80 may compare the image of the actuated spray device 40 with the image of the spray device 40 prior to actuation to identify differences in the images, e.g., the computer 80 may perform an image subtraction of the images, such as by using known image analysis algorithms and techniques. The identified differences may represent the fluid 44 spraying from the nozzle 46 of the spray device 40. The identified differences may be analyzed with criteria such as a size, a shape, a pixel density, etc. Criteria may be stored in the memory 84, e.g., as a file indicating an expected size, shape, and/or pixel density of the identified differences when no spray device fault exists. The stored criteria characteristics may be compared to the characteristics of the identified differences from the image comparison.

Figure 3:
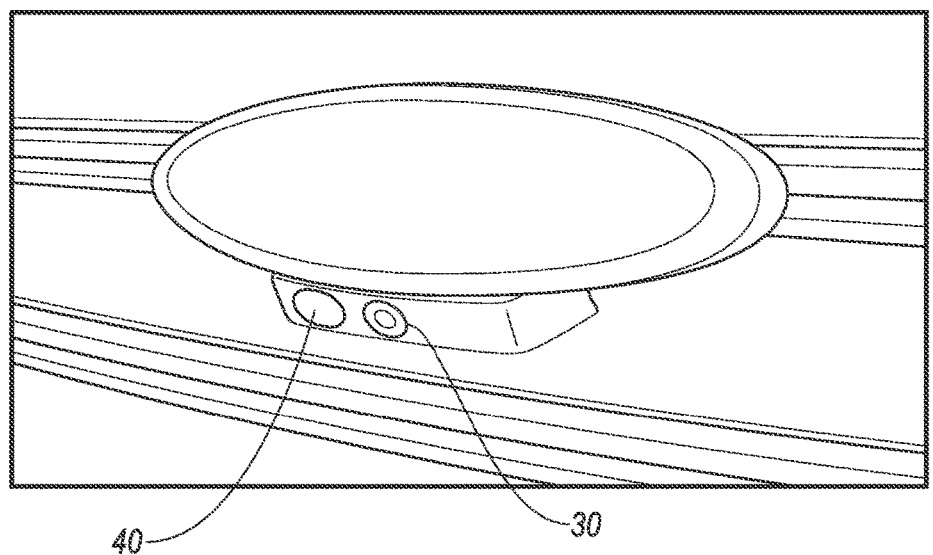
FIG. 3 is an illustration of an example image of the first vehicle prior to actuation of a spray device.
Figure 5:
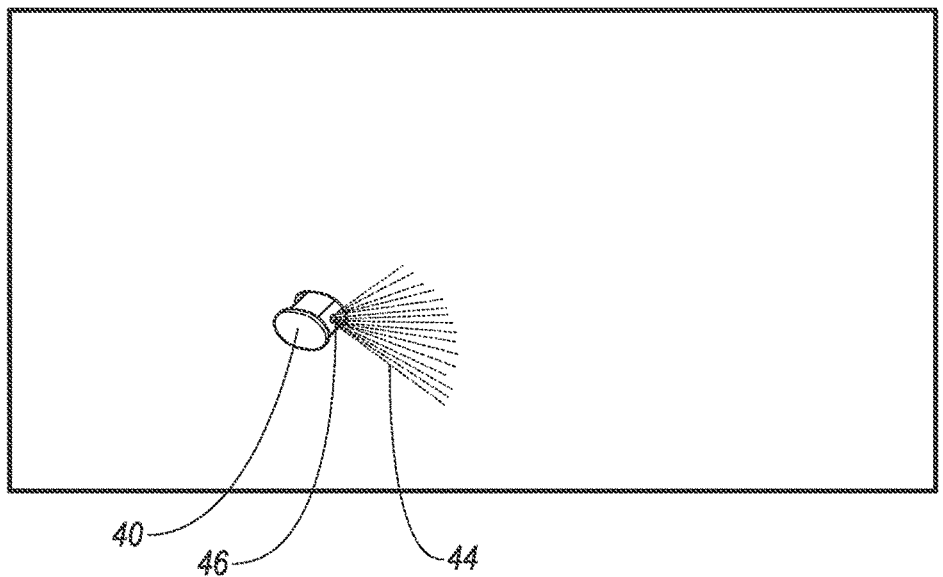
FIG. 5 is an illustration of a subtraction image of the images of FIG. 3 and FIG. 4.
Figure 7:
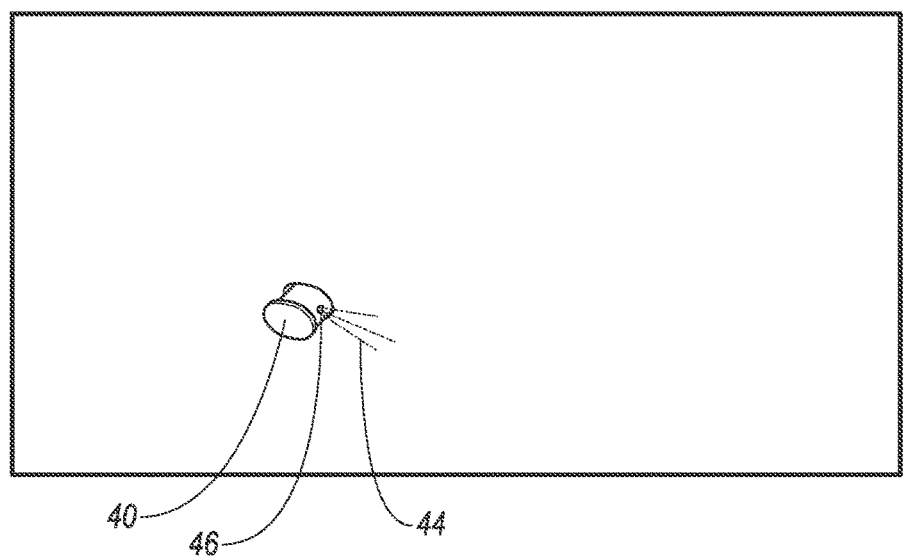
FIG. 7 is an illustration of a subtraction image of the images of FIG. 3 and FIG. 6.

For example, FIG. 5 represents an image generated by the computer 80 as a result of a subtraction analysis of the image shown in FIG. 3, where the spray device is actuated to the "off" state, and the image shown in FIG. 4, where the spray device 40 actuated to the "on" state. In another example, FIG. 7 represents an image generated by the computer 80 as a result of a subtraction analysis of the image shown in FIG. 3 and the image shown in FIG. 6, where the spray device 40 actuated to the "on" state. The computer 80 may analyze the subtraction analysis images, such as by using known image analysis techniques and algorithms, to compare the expected size, shape, and/or position of the fluid 44 with the fluid 44 identified in the image. For example, the size, shape, and/or pixel density of the fluid 44 in FIG. 5 may be analyzed relative to an expected size, shape, and/or pixel density, e.g. a triangle of a certain size and pixel density. Based on such analysis, the computer 80 may determine that no spray device fault exists based on the size of the triangle and the density of the pixels created by the fluid 44. In another example the size, shape, and/or pixel density of the fluid 44 in FIG. 7 may be analyzed relative to the expected triangle of certain size and pixel density. Based on such analysis, the computer 80 may determine that a spray device fault exists based on the size of the triangle and the density of the pixels created by the fluid 44.

Figure 8:
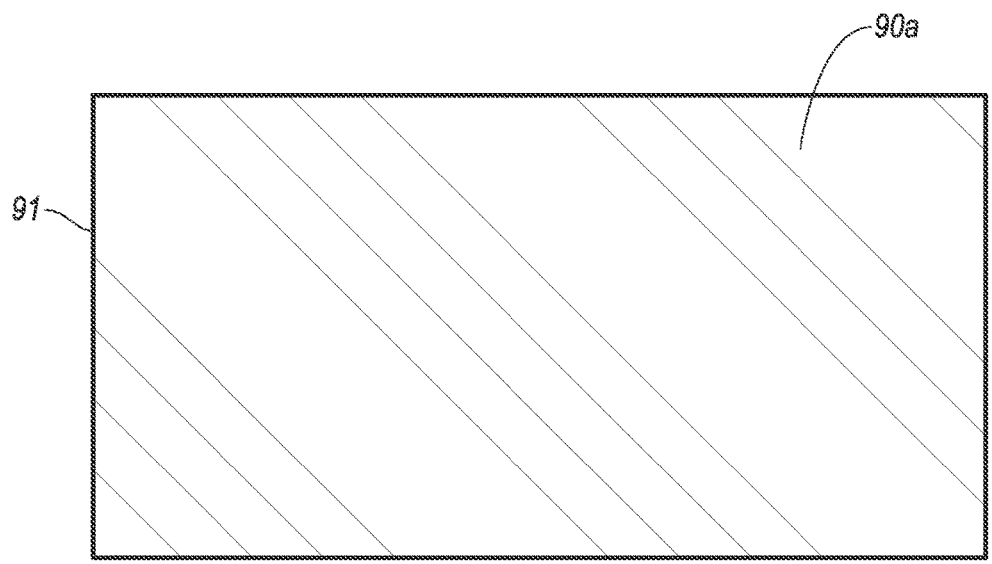
FIG. 8 is an illustration of an infrared thermal image of the first vehicle prior to actuation of the spray device.
Figure 9:
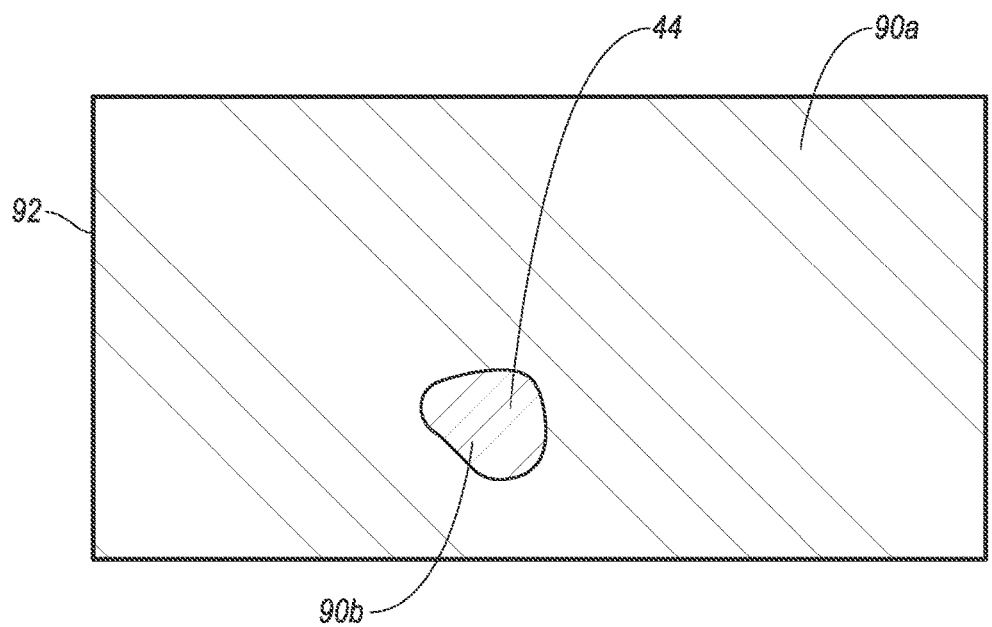
FIG. 9 is an illustration of an infrared thermal image of the first vehicle during actuation of the spray device.

With reference to FIGS. 8 and 9, illustrations of infrared pre-spray and post-spray images are shown, respectively. Known infrared image capture techniques produce images which include different color areas 90a and 90b in which different colors are associated with different temperatures. In the black-and-white drawing, different colors, e.g. infrared wavelengths, are indicated by respective cross hatch patterns.

The infrared pre-spray image illustrated in FIG. 8 illustrates an image 91 of a portion of a vehicle that has a pre-spray color 90a where the image was taken of the vehicle at an ambient temperature. The color 90a indicates a pre-spray temperature of the vehicle. It is to be understood that the vehicle will not always have a uniform pre-spray temperature, and therefore a pre-spray image may have more colors than the single color 90a, as externalities such as engine heat, air resistance, etc., may affect the temperature of the vehicle in discreet locations. The uniform color 90a is shown for ease of illustration. In practice additional colors and details may be detected, for example, colors and details resulting from openings in a grille of the vehicle allowing radiator heat to be detected, leading edges of various vehicle body styling features having a lower temperature from air resistance encountered while traveling, etc. The infrared post-spray image 92 illustrated in FIG. 9 includes a color area 90b indicative of an area of increased temperature from the heated fluid 44.

The computer 80 may analyze the infrared images 91 and 92, such as by using known image analysis techniques, to compare the expected size, shape, and/or position of the heated fluid 44 i.e., the area of increased temperature 90b. For example, the size, shape, and/or pixel density of the area of increased temperature 90b in the image 92 may be analyzed relative to an expected size, shape, and/or pixel density, e.g., a triangle of a certain size and pixel density, to determine a fault with the spray device 40, as described above.

The computer 80 may analyze the infrared images by comparing one or more various colors of each of the images 91, 92 with a temperature table or the like, e.g., stored in the memory 84, i.e., a temperature table associates respective colors with respective temperatures. The computer 80 may then determine a temperature change between the infrared images 91, 92. The temperature change may be determined based on an average temperature, an absolute maximum or minimum temperature, and/or a local maximum or minimum temperature represented in the infrared images 91, 92. The computer 80 may identify that the temperature change between the images 91, 92 is below a predetermined threshold, e.g., 10 degrees Fahrenheit, and utilize the temperature table to determine that a fault exists with the fluid heater 47, such as the fluid heater 47 not adequately heating the fluid 44. The computer 80 may identify the fault with the fluid heater 47 as a type of spray device fault 40.

The computer 80 may be programmed to transmit the spray device fault. To transmit the spray device fault, the computer 80 may instruct the communications network 50, e.g., by sending a command to the communications network 50 via the vehicle network 86, to perform such transmission. The spray device fault may be transmitted upon determining that such fault exists, as detailed above. The transmission of the spray device fault may be directed to a specific receiver, e.g., a service facility for the first vehicle 15a, for example by transmitting the spray device fault to a specific internet protocol (IP) address, email, etc.

The computer 80 may be programmed to transmit a camera fault. A camera fault is a condition of the camera 30 causing the camera 30 to not function properly. For example, the camera 30 may have a faulty internal electronic component, a damaged lens, etc. To transmit the camera fault, the computer 80 may instruct the communications network 50, e.g., by sending a command to the communications network 50 via the vehicle network 86, to perform such transmission. The camera fault may be transmitted in response to determining that the image from the camera 30 on the first vehicle 15a is below the predetermined quality threshold and that no spray device fault exists, as detailed above. The transmission of the camera fault may be directed to a specific receiver, e.g., the service facility for the first vehicle 15a, for example by transmitting the camera fault to a specific internet protocol (IP) address, email, etc.

The computer 80 may be programmed to actuate one more navigation sensors 60. Navigation sensors 60 are sensors 60 used by the computer 80 to operate the first vehicle 15a autonomously. For example, the computer 80 may send a command to the sensor 60 instructing the sensor 60 to send data to the computer 80, e.g. an instruction to a LIDAR device to gather and send information regarding the external world. The computer 80 may actuate the one or more navigation sensors 60 in response to determining the spray device fault exists.

The computer 80 may be programmed to navigate the first vehicle to a service facility. To navigate to the service facility, the computer 80 may actuate various vehicle components, such as known powertrain, braking and steering systems, based at least on information received from the sensors 60 and the navigation device 70. Navigation to the service facility may be performed in response to determining the spray device fault exists. Navigation to the service facility may be performed in response to determining the image from the camera 30 on the first vehicle 15*a* is below the predetermined quality threshold and that no spray device fault exists.

The computer 80 may be programmed to receive an image request from the second vehicle 15*b*. For example, the image request may be transmitted from the second vehicle 15*b* and received by the first vehicle 15*a* via the communications network 50. The computer 80 may receive the image request from the communications network 50 via the vehicle network 86. The image request may include a position of the second vehicle 15*b* relative to the first vehicle 15*a*.

The computer 80 may be programmed to actuate the camera 30 to capture an image of the second vehicle 15*b*. To actuate the camera 30 the computer 80 may send a command to the camera 30 via the vehicle network 86. The command may instruct the camera 30 to actuate to capture the image. The computer 80 may direct the command to a specific camera 30, e.g., the front camera 30*f* or the rear camera 30*r*. The camera 30 may be actuated to capture the image of the second vehicle 15*b* in response to receiving the image request from the second vehicle 15*b*.

The computer 80 may be programmed to transmit the image, e.g., the image captured by the camera 30 detailed above, from the first vehicle 15*a* to the second vehicle 15*b*. To transmit the image, the computer 80 may instruct the communications network 50, e.g., by sending a command to the communications network 50 via the vehicle network 86, to perform such transmission. The image may be transmitted in response to receiving the image request from the second vehicle 15*b*. The image may include information identifying the intended recipient of the image, e.g., the second vehicle 15*b*, such as a vehicle identification number or other unique identifier. The image may include a position of the first vehicle 15*a* relative to the second vehicle 15*b*.

Process

Figure 10:
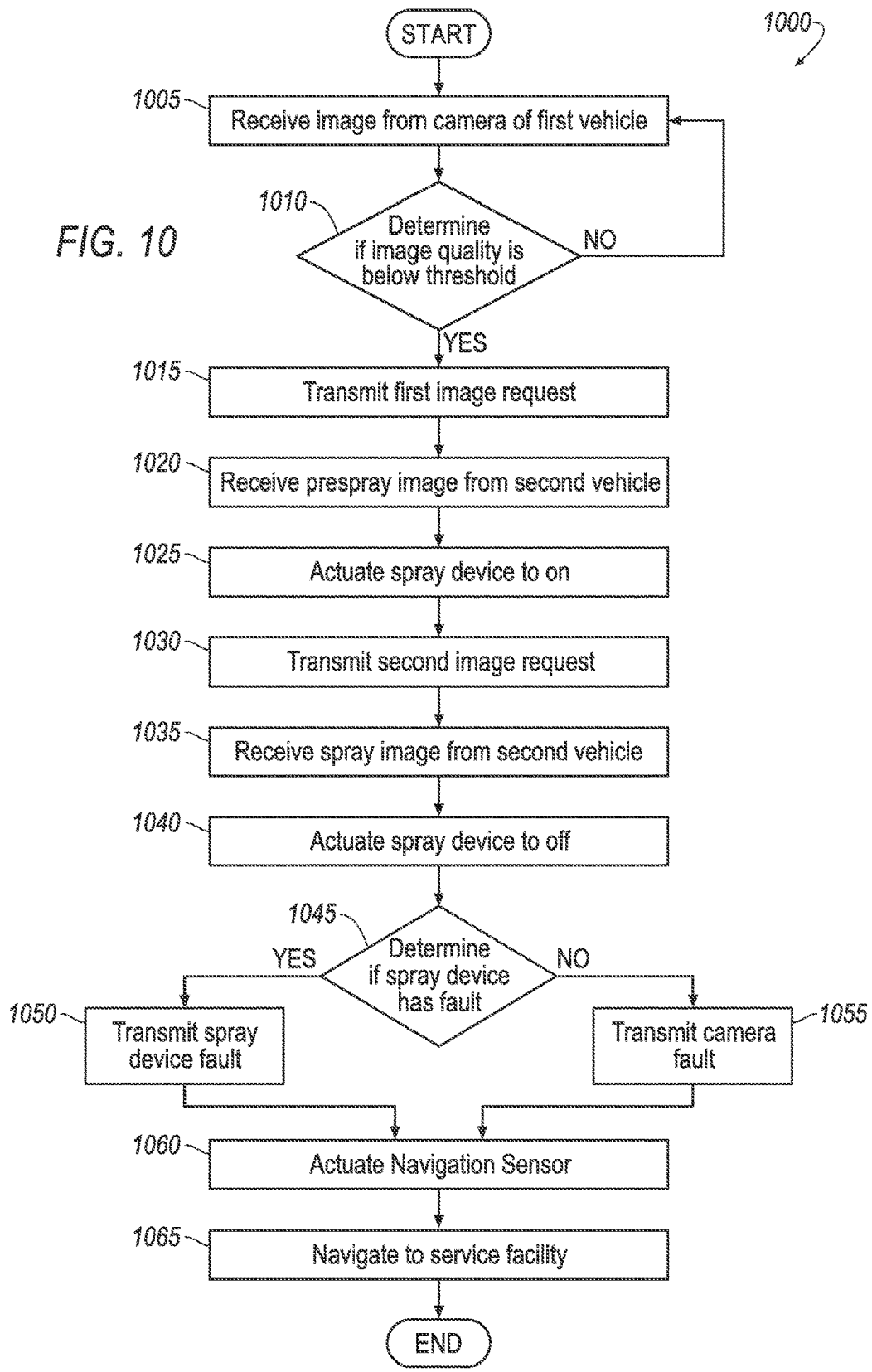
FIG. 10 is a flow chart of a process for diagnosing the first vehicle of FIG. 1.

FIG. 10 is a process flow diagram illustrating an exemplary process 1000 for diagnosing the camera 30 and spray device 40 of the first vehicle 15*a*. The process 1000 begins in a block 1005 and can be initiated in a variety of ways, for example, when the first vehicle 15*a* is powered on, at routine intervals, e.g., every 20 seconds, while the first vehicle 15*a* is operating, when the first vehicle 15*a* enters a platoon with one or more second vehicles 15*b*, etc.

At the block 1005 the computer 80 of the first vehicle 15*a* receives an image from the camera 30 of the first vehicle 15*a*. For example, the computer 80 may receive the image from the camera 30 via the vehicle network 86.

Next, at a block 1010 the computer 80 determines whether the image from the camera 30 on the first vehicle 15*a* is below the predetermined quality threshold, as described above. If the image is determined to be below the predetermined quality threshold the process 1000 moves to the block 1015. Otherwise the process 1000 returns to the block 1005 in a looped manner.

At a block 1015, which may follow the block 1010, the computer 80 transmits the image request. For example, the computer 80 may transmit the image request via the communications network 50. The image request may be transmitted while the spray device 40 is in the "off" state and prior to actuating the spray device 40 to the "on" state at a block 1025.

Next, at a block 1020 the computer 80 receives the image from the second vehicle 15*b*. For example, the computer 80 may receive the image via the communications network 50. The image may be received while the spray device 40 is in the "off" state and prior to actuating the spray device 40 to the "on" state at the block 1025.

Next, at a block 1025 the computer 80 actuates the spray device 40 to the "on" state. For example, the computer 80 may send a command to the spray device 40 via the vehicle network 86. Actuation of the spray device 40 to the "on" state may include actuation of the fluid heater 47. For example, the computer 80 may send a command to the fluid heater 47 via the vehicle network 86, as described above.

Next, at a block 1030 the computer 80 transmits the image request while the spray device 40 is actuated to the "on" state. For example, the computer 80 may transmit the image request via the communications network 50.

Next, at a block 1035 the computer 80 receives the image from the second vehicle 15*b* while the spray device is actuated to the "on" state. For example, the computer 80 may receive the image via the communications network 50.

Next, at a block 1040 the computer 80 may actuate the spray device 40 to the "off" state. For example, the computer 80 may send a command to the spray device 40 via the vehicle network 86.

Next, at a block 1045 the computer 80 determines whether the spray device fault exists, the spray device fault may include the fault with the fluid heater 47, as described above. If the computer 80 determines the spray device fault exists, the process 800 moves to moves to a block 1050. Otherwise the process 1000 moves to a block 1055.

At the block 1050, which may follow the block 1045, the computer 80 transmits the spray device fault. For example, the computer 80 may transmit the spray device fault via the communications network 50.

At the block 1055, which may follow the block 1045, the computer 80 transmits the camera fault. For example, the computer 80 may transmit the camera fault via the communications network 50.

Next at a block 1060 the computer 80 actuates one or more navigation sensors 60, as described above.

At a block 1065 the computer 80 navigates the first vehicle 15*a* to the service facility, as described above.

Following the block 1065 the process 1000 ends.

Figure 11:
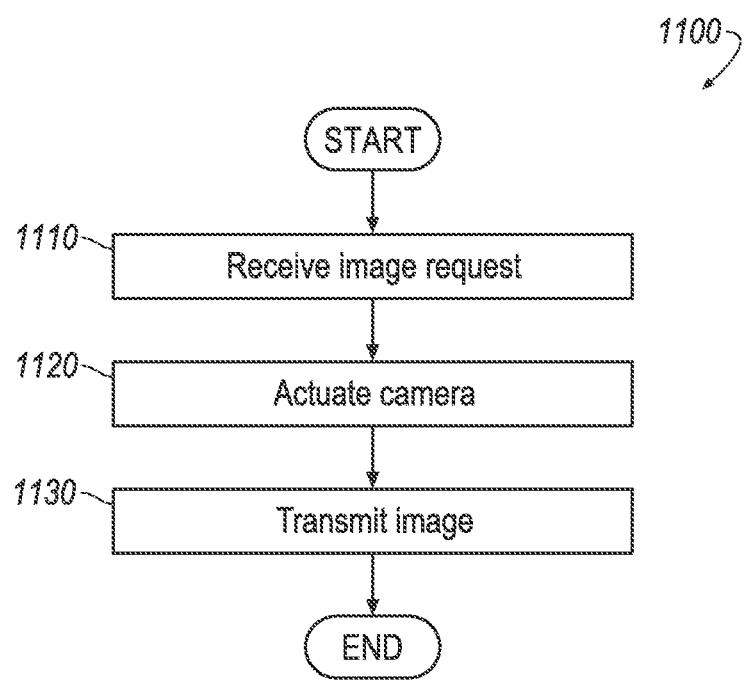
FIG. 11 is a flow chart of a process for the first vehicle of FIG. 1 to assist in diagnosing the second vehicle of FIG. 1.

FIG. 11 is a process flow diagram illustrating an exemplary process 1100 for providing images from the first vehicle 15*a* to the second vehicle 15*b* to assist the second vehicle 15*b* in diagnosing the camera 30 and spray device 40 of the second vehicle 15*b*. The process 1100 begins in a block 1110 and can be initiated in a variety of ways, for example, when the first vehicle 15*a* is powered on, at routine intervals, e.g., every 20 seconds, while the first vehicle 15*a* is operating, when the first vehicle 15*a* enters a platoon with one or more second vehicles 15*b*, etc.

At the block 1110 the computer 80 of the first vehicle 15*a* receives the image request from the second vehicle 15*b*. For example, the image request may be received via the communications network 50.

Next, at a block 1120 the computer 80 actuates the camera 30 to capture an image of the second vehicle 15*b*. For example, the computer 80 may send a command to the front camera 30f or the rear camera 30 via the vehicle network 86.

Next, at a block 1130 the computer 80 transmits the image of the second vehicle 15b. For example, the image of the second vehicle 15b may be transmitted via the communications network 50.

Following the block 1170 the process 1100 ends.

Conclusion

Computing devices as discussed herein generally each include instructions executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in the computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A system, comprising a computer, programmed to:
   actuate a spray device on a first vehicle;
   receive a first image of the actuated spray device captured by a camera of a second vehicle and transmitted from the second vehicle to the first vehicle;
   determine whether a spray device fault exists or does not exist based at least on the first image; and
   upon determining the spray device fault exists, transmit the spray device fault via a first vehicle communications network of the first vehicle.

2. The system of claim 1, the computer further programmed to:
   navigate the first vehicle to a service facility in response to determining the spray device fault exists.

3. The system of claim 1, the computer further programmed to:
   receive a second image of the spray device prior to actuation from the second vehicle;
   wherein the determination of whether the spray device fault exists or does not exist is further based at least on the second image of the spray device prior to actuation.

4. The system of claim 1, the computer further programmed to:
   determine whether a second image from a camera on the first vehicle is below a predetermined quality threshold; and
   transmit an image request to the second vehicle in response to determining the second image from the camera on the first vehicle is below the predetermined quality threshold.

5. The system of claim 4, the computer further programmed to:
   transmit a camera fault via the first vehicle communications network in response to determining that the second image from the camera on the first vehicle is below the predetermined quality threshold and upon determining that the spray device fault does not exist.

6. The system of claim 5, the computer further programmed to:
   navigate the first vehicle to a service facility in response to determining the second image from the camera on the first vehicle is below the predetermined quality threshold and upon determining that the spray device fault does not exist.

7. The system of claim 1, the computer further programmed to:
   transmit an image request to the second vehicle, the image request including a position of the first vehicle relative to the second vehicle.

8. The system of claim 1, the computer further programmed to:
   actuate a navigation sensor in response to determining the spray device fault exists.

9. The system of claim 1, the computer further programmed to:
   actuate a camera of the first vehicle to capture a second image of the second vehicle; and
   transmit the second image from the first vehicle to the second vehicle.

10. The system of claim 9, the computer further programmed to:
    actuate the camera of the first vehicle in response to receiving an image request from the second vehicle.

11. The system of claim 1, wherein the first image is an infrared image.

12. A method comprising:
actuating a spray device on a first vehicle;
receiving a first image of the actuated spray device captured by a camera of a second vehicle and transmitted from the second vehicle to the first vehicle;
determining whether a spray device fault exists or does not exist based at least on the first image; and
upon determining the spray device fault exists, transmitting the spray device fault via a first vehicle communications network.

13. The method of claim 12, further comprising:
navigating the first vehicle to a service facility in response to determining the spray device fault exists.

14. The method of claim 12, further comprising:
receiving a second image of the spray device prior to actuation from the second vehicle;
wherein the determination of whether the spray device fault exists or does not exist is further based at least on the second image of the spray device prior to actuation.

15. The method of claim 12, further comprising:
determining whether a second image from a camera on the first vehicle is below a predetermined quality threshold; and
transmitting an image request to the second vehicle in response to determining the second image from the camera on the first vehicle is below the predetermined quality threshold.

16. The method of claim 15, further comprising:
transmitting a camera fault via the first vehicle communications network in response to determining that the second image from the camera on the first vehicle is below a predetermined quality threshold and upon determining that the spray device fault does not exist.

17. The method of claim 16, further comprising:
navigating the first vehicle to a service facility in response to determining that the second image from the camera on the first vehicle is below a predetermined quality threshold and that no spray device fault exists.

18. The method of claim 12, further comprising:
transmitting an image request to the second vehicle, the image request including a position of the first vehicle relative to the second vehicle.

19. The method of claim 12, further comprising:
actuating a navigation sensor in response to determining the spray device fault exists.

20. The method of claim 12, further comprising:
actuating a camera of the first vehicle to capture a second image of the second vehicle; and
transmitting the second image from the first vehicle to the second vehicle.

* * * * *